United States Patent [19]

Shieh et al.

[11] Patent Number: 5,371,209
[45] Date of Patent: Dec. 6, 1994

[54] PROCESS FOR SEPARATING CYCLODEXTRIN FROM A COMPLEX

[75] Inventors: Wen Shieh; Allan Hedges, both of Crown Point, Ind.

[73] Assignee: American Maize-Products Company, Stamford, Conn.

[21] Appl. No.: 78,011

[22] Filed: Jun. 15, 1993

Related U.S. Application Data

[63] Continuation-in-part of Ser. No. 28,421, Mar. 9, 1993, abandoned.

[51] Int. Cl.5 .................. C08B 37/16; C08B 1/06
[52] U.S. Cl. ......................... 560/103; 536/127
[58] Field of Search .................. 536/103, 127

[56] References Cited

U.S. PATENT DOCUMENTS 5,008,386 4/1991 Szabó et al. .................. 536/103
5,183,809 2/1993 Weisz et al. .................. 514/58

FOREIGN PATENT DOCUMENTS 83413 8/1991 Australia .
2035156 7/1991 Canada .
2035157 7/1991 Canada .

OTHER PUBLICATIONS

"An Introduction to Modern Experimental Organic Chemistry" Roberts et al. pp. 62–64 Holt, Rinehart, and Winston Inc., USA (1974).

Primary Examiner—Morton Foelak
Assistant Examiner—Jeffrey Culpeper Mullis
Attorney, Agent, or Firm—Lucas & Just

[57] ABSTRACT

The process entails adding salt in an amount of 1% to 5% by weight slurry to an aqueous slurry of cyclodextrin-guest complex at a temperature of 100° C. to 150° C. for a period of 5 minutes to 2 hours and a pressure of 15 psia to 70 psia to prevent the slurry from boiling and to cause the complex to break apart. The individual cyclodextrin and guest are then recovered.

18 Claims, No Drawings

PROCESS FOR SEPARATING CYCLODEXTRIN FROM A COMPLEX

This is a continuation-in-part of U.S. Pat. application Ser. No. 08/028,421 filed Mar. 9, 1993.

This invention relates to a process for separating a cyclodextrin from a cyclodextrin-guest complex and recovering both the cyclodextrin and the guest from the complex without destroying either the guest or the cyclodextrin.

Cyclodextrins are cyclic dextrins obtained by treating a starch or starch-based material with a cyclodextrin glycosyl transferase at the appropriate conditions for the enzyme. The three major commercially available cyclodextrins are alpha, beta and gamma cyclodextrins.

It is well-known that due to the physical and chemical structure of cyclodextrin, cyclodextrin is able to form an inclusion complex with another compound thereby absorbing the other compound. The complexation phenomenon has been used to separate unwanted components from food systems. For example, U.S. Pat. No. 4,880,513 discloses the use of cyclodextrin to absorb cholesterol from animal fat and the removal of the cholesterol-cyclodextrin complex from the fat. Once the complex is removed, one is faced with the problem of either recovering the individual components from the complex or simply discarding the complex.

It has been suggested that a solvent be used to separate the complex into individual components, for example, see Canadian Patent Application Nos. 2,035,156 and 2,035,157; European Patent Application Publication Nos. 466,600 published Jan. 15, 1992, and 440,539 published Aug. 7, 1991; and Australian Application No. AU-A-83413/91. Additionally, the use of acid and/or enzyme has been suggested for recovering the guest from the complex. See French Patent Application Publication No. 2,657,623. The problem with using an acid and/or enzyme to recover the guest from the complex is that the acid and/or enzyme destroys the cyclodextrin. It is preferable that both the guest and cyclodextrin be separated such that the cyclodextrin remains intact and can be recycled. It is also desirable to recover the guest, intact.

It has now been discovered that, if an aqueous slurry of the complex is treated with a salt at an elevated temperature without boiling the slurry, the complex is resolved into the individual components. Broadly, the process of the present invention comprises treating an aqueous slurry of cyclodextrin-guest complex with a salt at a temperature of about 100° C. to about 150° C. and a pressure above the vapor pressure of the slurry to prevent the slurry from boiling and to cause the complex to separate into the individual components of cyclodextrin and guest. Next, the separated components are recovered. The term guest as used in the specification and claims means absorbed compound while the cyclodextrin is considered to be the host compound.

The present invention does not destroy either the cyclodextrin or the guest. This means that the cyclodextrin can be recycled and that the guest can be used for other purposes. Although it is not completely understood why the present invention works, it is thought that the combination of the heat and salt breaks the complex. It is also thought that the salt prevents reassociation of the guest with the cyclodextrin and promotes the formation of the guest as a layer on top of the aqueous slurry. In the case of guests which are lipids, such as cholesterol, it has been found that the lipid forms a layer, an oily layer, on top of the aqueous phase. This oily phase is then recovered from the aqueous phase.

When recovering the cyclodextrin, the salt need not be separated from the cyclodextrin but may be carried along with the cyclodextrin. Generally, the cyclodextrin is maintained in an aqueous slurry and recycled in the aqueous slurry. The addition of the salt and cyclodextrin to a larger aqueous system causes the salt to be diluted to a degree that it, generally, does not have an effect on the complexation process. If need be, however, the salt and cyclodextrin can be separated in a conventional manner.

Suitable salts for use in the present invention include any conventional salt capable of ionizing in the slurry of the present invention. Preferably, the salt used in the present invention is an alkali metal salt or an alkaline earth metal salt which becomes ionized in the aqueous slurry. More preferably, the salt used in the present invention is a sodium, potassium, magnesium, or calcium salt. Most preferred, the salt used in the present invention is selected from the group consisting of sodium chloride, potassium chloride, calcium chloride, sodium phosphate, potassium phosphate, sodium nitrate, sodium acetate, sodium citrate. Good results have been obtained with sodium chloride.

The amount of salt used in the present invention depends upon the amount of complex in the aqueous slurry. The amount of salt added to the slurry is about 1% to about 50% by weight based on the weight of complex in the slurry and, more preferably, about 10% to about 20% by weight based on the weight of the complex in the slurry. As will be appreciated by those of skill in the art, the amount of salt added to the slurry can also be expressed as a weight percent based on the weight of the slurry. Preferably, where the complex is present in the slurry in an amount of about 1% to about 40% by weight slurry, the amount of salt added to the slurry is about 1% to about 15% by weight slurry. The amount of salt is adjusted so that the concentration of salt in solution is sufficient to obtain partitioning of the guest from the slurry such that the guest forms a layer on top of the slurry.

Suitable forms of the salt include dry crystals or solid form; however, the salt can be added in the form of a liquid, i.e. a salt solution. Any conventional source of salt can be used. In the case of food systems, the salt should be food grade if the cyclodextrin is to be recycled.

The salt used during the treatment step can be either added at the time of treatment or can already be present in solution.

The process of the present invention must take place in an aqueous environment. Normally, when the complex is recovered from a system, the complex is in an aqueous environment, i.e. a slurry of about 1% to about 40% by weight. If, however, the complex is in a dry state, then water must be added so that the process of the present invention is conducted in an aqueous environment. Preferably, prior to the treatment with heat and salt, the complex is in an aqueous slurry at a concentration of about 1% to about 40% by weight and, more preferably, about 5% to about 30% by weight.

The temperature during the salt treatment step should be above room temperature and preferably about 100° C. to about 150° C. More preferably, the temperature during the salt treatment step is about 110° C. to about 130° C. Good results have been obtained at a temperature of about 120° C.

The pressure during the salt treatment step should be such that it prevents the water from boiling, i.e. the pressure should be maintained above the vapor pressure of the slurry. Preferably, the pressure is maintained just above the vapor pressure to prevent boiling. For example, at 120° C., the pressure is about 30 psia. This pressure will vary depending upon the make-up of the slurry. In accordance with the present invention in the temperature range of about 100° C. to about 150° C., the pressure is maintained at about 15 psia to about 70 psia, depending upon the boiling point of the slurry, to prevent the slurry from boiling. More preferably, in the temperature range of about 110° C. to about 130° C., the pressure is maintained at about 20 psia to about 40 psia. At a temperature of about 120° C., good results have been obtained with a pressure of about 30 psia.

The time for the salt treatment step is such that the complex is broken between the cyclodextrin and the guest. Preferably, the salt treatment step lasts about 10 minutes to about 2 hours and, more preferably, about 15 minutes to about 1 hour. Good results have been obtained in about 15 minutes to about 30 minutes.

Conventional equipment is used to perform the process of the present invention. Good results for the salt treatment step have been obtained in a batch operation using a jacketed kettle.

It is preferred that the slurry be mildly agitated during the salt treatment step. This agitation or stirring is done using conventional equipment in a conventional manner. It has been found that the degree of separation is increased by about twofold or more when stirring or agitation is used during the salt treatment step.

Recovering the individual components of cyclodextrin and guest after the salt treatment step is conducted with conventional equipment in a conventional manner. Where the guest is a lipid and the complex came from a food system, an oil layer forms on top of the aqueous slurry. The oil layer is separated from the aqueous solution and leftover food particles are also filtered from the aqueous slurry. A clear cyclodextrin and salt solution is left behind and is recycled back to the food system for reuse.

Alternatively, the cyclodextrin can be crystallized from the solution containing the salt and the cyclodextrin. This is typically done after concentrating the solution. This is done with conventional equipment in a conventional manner.

In some cases, the solution of complexed cyclodextrin and lipid has food particles which are proteins. This is especially true for complexes obtained from the de-cholesterizing of egg yolks. These egg proteins have been found to make the separation of the decomplexed cyclodextrin from the residual protein very difficult. Specifically, it has been found that in certain instances these proteins form gels which substantially hinder the recovery of the cyclodextrin from solution or the recycling of a substantially pure cyclodextrin-salt solution. Such proteins are often present with the solution of complexed cyclodextrin and guest not only from the decholesterizing of eggs but also from the decholesterizing of milk products, especially milk itself.

In order to assist in the recovery of the cyclodextrin and to avoid the gelling problem, it is preferred that the pH of the solution be adjusted to about 5 to about 8. By adjusting the pH of the solution, the protein precipitates and, in the case of egg protein, rises to the top of the solution. This allows the protein to be removed with the cholesterol from the top of the solution while the salt and cyclodextrin stay in solution.

The step of adjusting the pH can be conducted before, during or after the salt treatment step. Preferably, adjusting the pH is done during the salt treatment step to allow both the lipid guest and the protein to be removed simultaneously from the solution. It has been found that the pH adjustment step hinders or prevents the formation of the gel.

With respect to chicken egg yolks, suitable results have been obtained by adjusting the pH to about 6 to about 7.

The exact reason why the pH adjustment assists in recovery of the cyclodextrin and prevents the gel formation is not completely understood. In accordance with the present invention, in order to assist in the recovery of the cyclodextrin, the pH of the slurry is adjusted to prevent the non-cyclodextrin material from interfering with the recovery of the cyclodextrin. If the pH is too low, e.g. about 1, then the cyclodextrin may be hydrolyzed. Preferably, the pH is above about 1 to avoid hydrolyzation of the cyclodextrin. This pH adjustment has been found to assist in the filtration process. The pH adjustment step in accordance with the present invention can be conducted for any molecule present in solution in order to assist the separation of that molecule from the cyclodextrin and salt.

The pH adjustment is conducted in a conventional manner using conventional equipment. For example, either an acid or base is added and mixed into the solution. Suitable bases and acids include any food grade bases and acids such as sodium hydroxide and hydrochloric acid.

An ion exchange step can be performed on the recovered solution of cyclodextrin and salt to reduce the amount of salt either before crystallization of the cyclodextrin or before recycling the cyclodextrin solution. The ion exchange step is done in a conventional manner using conventional equipment.

The present invention breaks the complex of cyclodextrin and guest when the guest is hydrophobic or has a hydrophobic portion binding with cyclodextrin. It has been found to work especially well with lipids such as cholesterol.

The process of the present invention works on complexes of a guest and a cyclodextrin. The term cyclodextrin as used in the specification and claims means not only alpha, beta and gamma cyclodextrin but also polymerized cyclodextrins, modified cyclodextrins and branched cyclodextrins. Branched cyclodextrins are cyclodextrins having glucose monomers or parts thereof bonded to the exterior of the cyclodextrin. Good results have been obtained with beta cyclodextrin complexes.

In a preferred embodiment of the present invention, an aqueous slurry of beta cyclodextrin/cholesterol complex at a solids level of about 10% to about 30% by weight slurry was treated with sodium chloride in an amount of about 1% to about 5% by weight slurry at a temperature of about 120° C. and a pressure of about 30 psia for a period of about 15 minutes to about 30 minutes. After the treatment an oil layer containing cholesterol was separated from the aqueous phase, and subsequently food particles left in the aqueous phase were separated using a vacuum filter. The aqueous solution of salt and beta cyclodextrin was then recycled.

These and other aspects of the present invention may be more fully understood by reference to the following examples:

EXAMPLE 1

This example illustrates that a pH adjustment of a slurry containing a cyclodextrin complex does not cause the complex to separate and that higher levels of heat do not cause decomplexation.

A 10% slurry of beta cyclodextrin/cholesterol complex obtained from the decholesterolization of cream was prepared. No salt was added to the slurry. The slurry was divided into two parts. In one part, the pH of the slurry remained as is; in the other part the pH of the slurry was adjusted to pH 10. Both slurries were then treated at 121° C. for 15 minutes at a pressure of 30 psia in an autoclave. After the heat treatment, cholesterol did not separate from either aqueous solution.

EXAMPLE 2

This example illustrates the use of both heat and salt to cause decomplexation.

Five (5) grams of sodium chloride were added to a 10% slurry of beta cyclodextrin/cholesterol complex. The mixture was then treated at 121° C. for 15 minutes at a pressure of 30 psia in an autoclave. After the heat treatment, a cholesterol layer which formed on top of the solution was separated from the aqueous layer using a separation funnel. The aqueous solution was maintained at 90° to 95° C. and the impurities left in the solution were removed by vacuum filtration. The amount of beta cyclodextrin in the solution was determined using a conventional HPLC method. About 68.9% by weight of beta cyclodextrin based on the total weight of both cyclodextrins in solution prior to the salt treatment step was recovered.

EXAMPLE 3

This example illustrates the process of the present invention at different salt additions and in aqueous solution of cyclodextrin at different solids levels.

Different amounts (2%, 5%, 10% and 15% by weight slurry) of salt were added to 10%, 15% and 20% slurry of beta cyclodextrin/cholesterol complex. The pH of the slurries remained as is. The slurries were then treated at 121° C. for 15 minutes at a pressure of 30 psia in an autoclave. After the heat treatment, the cholesterol layer was separated from the aqueous layer. The aqueous solution was maintained at 90 to 95° C. and the impurities left in the solution were removed by vacuum filtration. The amount of beta cyclodextrin in the solution was determined using a conventional HPLC method. The beta cyclodextrin recovery efficiencies are listed below:

|  | % Beta Cyclodextrin Recovered | | |
| --- | --- | --- | --- |
|  | 10% Slurry | 15% Slurry | 20% Slurry |
| 2% NaCl | 68.57% | 68.08% | 65.99% |
| 5% NaCl | 80.29% | 69.99% | 71.44% |
| 10% NaCl | 83.33% | 75.08% | 74.91% |
| 15% NaCl | 83.71% | 84.40% | 80.64% |

EXAMPLE 4

This example illustrates the pH adjustment to prevent gel formation and to assist in the recovery of the cyclodextrin in accordance with the present invention.

In a slurry which contained a complex of beta cyclodextrin and cholesterol and other components in a chicken egg yolk, the pH was adjusted using sodium hydroxide. The slurry was divided into 14 samples, each of which contained 50 ml of slurry. It was found that at a pH of 6.2 and 7.1, the egg protein coagulated and rose to the top of the solution. At the pH levels of 8.3 and above, the protein did not rise to the surface of the slurry.

It was also seen that although the complex did decomplex without mixing, the mixing substantially improved the results, i.e. over a twofold increase in separation. The results of this test and the pH levels used in this example are listed below:

| Grams Beta Cyclodextrin per 100 ml of Slurry | | | |
| --- | --- | --- | --- |
| Without Mixing | | With Mixing | |
| pH | Grams of Beta CD | pH | Grams of Beta CD |
| 4.7 | 1.81 | 4.7 | 6.89 |
| 6.2 | — | 6.2 | 7.29 |
| 7.1 | 3.17 | 7.1 | 7.16 |
| 8.2 | 3.03 | 8.4 | 6.93 |
| 9.1 | 2.75 | 9.2 | 6.85 |
| 10.2 | 2.42 | 10.2 | 6.59 |
| 11.0 | 2.02 | 11.2 | 6.72 |

The treatment was carried out with the slurry in an amount of about 10% by weight solids. The slurry was heated to a temperature of 100° C. with or without mixing as indicated. The slurry was filtered and the number of grams of cyclodextrin was determined using HPLC. The amount of salt in solution was around 5–10% by weight slurry.

The original slurry had a solids level around 15% and was recovered from a process in which chicken egg yolks had been decholesterized.

It will be understood that the claims are intended to cover all changes and modifications of the preferred embodiment of the invention herein chosen for the purpose of illustration which do not constitute a departure from the spirit and scope of the invention.

What is claimed is:

1. A process for separating cyclodextrin from a complex consisting of the steps of:
   (a) treating an aqueous slurry of a cyclodextrin-guest complex with a salt and with heat effective to bring the temperature of the slurry to about 100° C. to about 150° C., the pressure of the slurry being above the vapor pressure of the slurry to prevent the slurry from boiling, so that the complex breaks into separate components of cyclodextrin and guest; and
   (b) recovering the cyclodextrin.

2. The process of claim 1 wherein the pressure is about 15 psia to about 70 psia.

3. The process of claim 1 wherein the salt is an alkali metal salt or an alkaline earth metal salt.

4. The process of claim 1 wherein the amount of salt used in the treatment step is about 1% to about 50% by weight of complex in the slurry.

5. The process of claim 1 wherein the slurry is about 10% to about 30% by weight solids and the amount of salt used in the treatment is about 1% to about 5% by weight slurry.

6. The process of claim 1 wherein the length of the treatment lasts about 5 minutes to about 2 hours.

7. The process of claim 1 wherein the length of the treatment lasts about 15 minutes to about 30 minutes.

8. The process of claim 1 wherein the salt is sodium chloride.

9. The process of claim 1 wherein the guest is a lipid.

10. The process of claim 1 wherein the cyclodextrin is beta cyclodextrin.

11. The process of claim 1 wherein the aqueous slurry is mildly agitated during the treatment step.

12. The process of claim 1 wherein the pH of the slurry is adjusted during the treatment step to prevent non-cyclodextrin material from interfering with recovery of cyclodextrin.

13. A process for separating beta cyclodextrin from a beta cyclodextrin-lipid complex consisting of the steps of:
(a) treating an aqueous slurry of beta cyclodextrin-lipid complex having a solids content of about 10% to about 30% by weight with a salt in an amount of about 1% to about 5% by weight based on the weight of the slurry, at a temperature of about 110° C. to about 130° C. and a pressure of about 20 psia to about 40 psia for a period of about 10 minutes to about 1 hour to cause the complex to break into individual beta cyclodextrin and lipid; and
(b) recovering the beta cyclodextrin.

14. The process of claim 13 wherein the salt is sodium chloride.

15. The process of claim 13 wherein the aqueous slurry is agitated during the treatment step.

16. The process of claim 13 wherein the pH of the slurry is adjusted to prevent non-cyclodextrin material from interfering with recovery of cyclodextrin.

17. A process for separating cyclodextrin from a complex consisting of the steps of:
(a) treating an aqueous slurry of a cyclodextrin-guest complex with a salt and with heat effective to bring the temperature of the slurry to about 100° C. to about 150° C., maintaining pressure on the slurry throughout the entire process, said pressure being above the vapor pressure of the slurry to prevent the slurry from boiling, so that the complex breaks into separate components of cyclodextrin and guest; and
(b) recovering the cyclodextrin.

18. A process for separating cyclodextrin from a complex consisting of the steps of:
(a) treating an aqueous slurry of a cyclodextrin-guest complex with a salt and with heat effective to bring the temperature of the slurry to about 100° C. to about 150° C., maintaining pressure on the slurry throughout the entire process, said pressure being above the vapor pressure of the slurry to prevent the slurry from boiling, so that the complex breaks into separate components of cyclodextrin and guest; and
(b) recovering the cyclodextrin.

* * * * *

UNITED STATES PATENT AND TRADEMARK OFFICE
CERTIFICATE OF CORRECTION

PATENT NO. : 5,371,209
DATED : December 6, 1994
INVENTOR(S) : Wen J. Shieh et al.

It is certified that error appears in the above-indentified patent and that said Letters Patent is hereby corrected as shown below:

Column 7, line 10 (claim 11), delete "mildly".

Signed and Sealed this

Eleventh Day of April, 1995

Attest:

BRUCE LEHMAN

*Attesting Officer*     *Commissioner of Patents and Trademarks*